Figure 1:
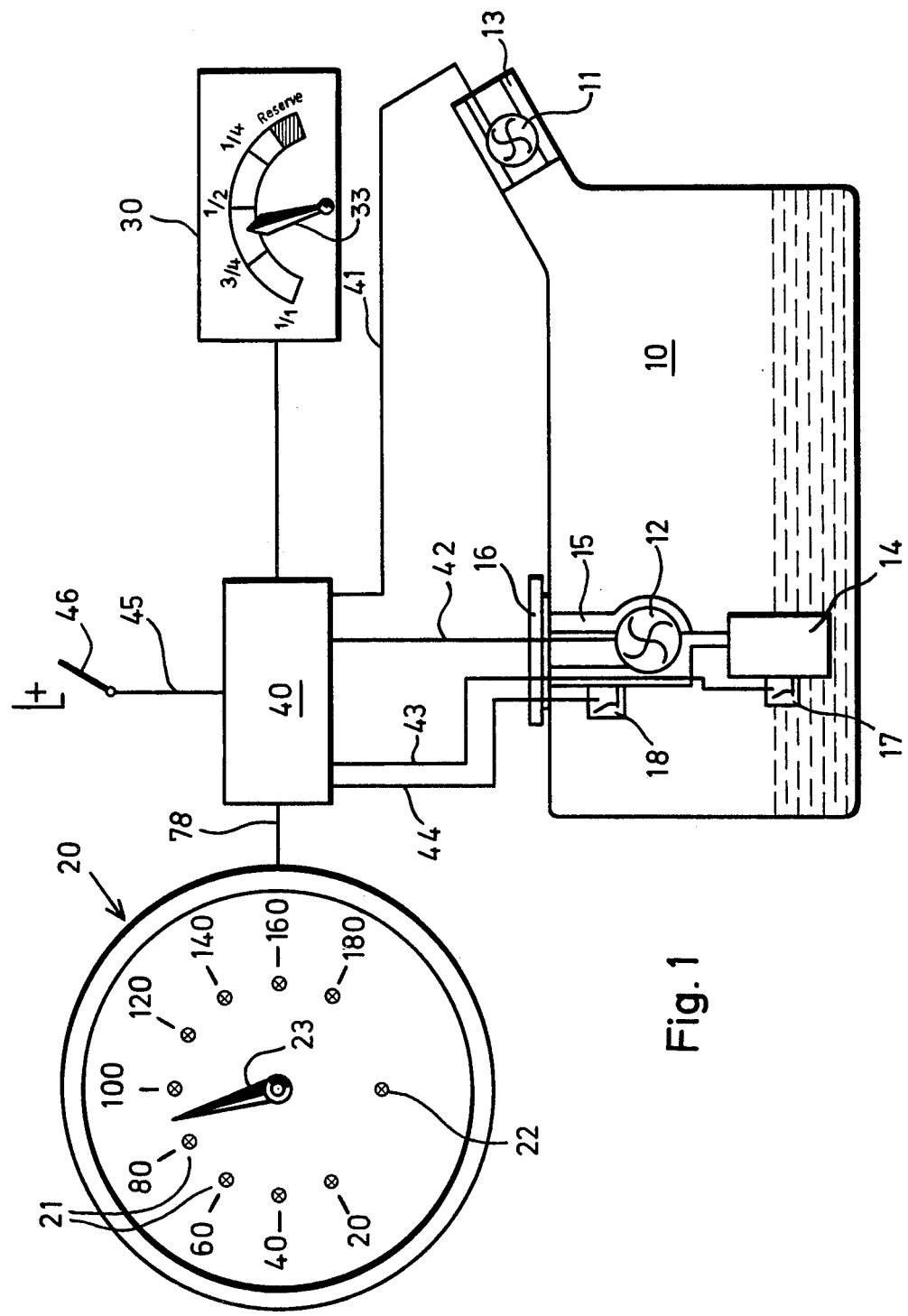

United States Patent [19]

Prohaska et al.

[11] 4,244,210
[45] Jan. 13, 1981

[54] COMBINED FUEL LEVEL AND FUEL CONSUMPTION INDICATOR

[75] Inventors: Hans Prohaska, Bietigheim-Bissingen; Eckhardt Schmid, Güglingen, both of Fed. Rep. of Germany

[73] Assignee: ITT Industries, Inc., New York, N.Y.

[21] Appl. No.: 973,129

[22] Filed: Dec. 26, 1978

[51] Int. Cl.³ .............................................. G01F 9/00
[52] U.S. Cl. .................................................... 73/113
[58] Field of Search ...................... 73/114, 113, 290 R; 364/442; 222/36

[56] References Cited

U.S. PATENT DOCUMENTS

| | | | |
|---|---|---|---|
| 3,602,322 | 8/1971 | Gorsuch | 73/155 X |
| 3,908,451 | 9/1975 | Walker et al. | 73/114 |

FOREIGN PATENT DOCUMENTS

| | | | |
|---|---|---|---|
| 2357770 | 11/1973 | Fed. Rep. of Germany | 73/114 |
| 914806 | 1/1963 | United Kingdom | 73/290 |

Primary Examiner—Jerry W. Myracle
Attorney, Agent, or Firm—James B. Raden; William J. Michals

[57] ABSTRACT

The quantity of fuel being in a tank of a motor vehicle is computed in an evaluation circuit to which two primary element signals are supplied, of which one is proportional to the quantity of fuel filled in at the service station and the other is proportional to the quantity of fuel consumed. The evaluation circuit provides an output signal indicative of the difference between the fuel in and fuel consumed. Accordingly, the shape of the fuel tank does not influence the exactness of the measured value. One signal is available from which the fuel consumption as a function of time can be sensored and which is indicated at an indicator integrated into the speedometer.

3 Claims, 2 Drawing Figures

COMBINED FUEL LEVEL AND FUEL CONSUMPTION INDICATOR

In connection with the fuel consumption the driver of a motor vehicle needs continuous information concerning the quantity of fuel left in the tank. In most motor vehicles the level of fuel in the tank is measured by a float adjusting a potentiometer in dependence on the fluid level in the tank. The signal to be picked off at the potentiometer is indicated by a voltmeter. Because the shape of the tanks is very different in various types of motor vehicles the potentiometer in each case has to be accordingly computed and designed which is very expensive and complicated. Especially with large-surface tanks with small overall height this procedure is not very exact and partly not possible at all.

Besides modern motor vehicles are increasingly equipped with fuel consumption gauges putting the fuel flow in relation to time and/or way and indicating the consumption as a numerical value. By this information the driver is to be enabled to drive in a manner that he can save fuel. The measuring instruments known until now are installed into the instrument panel as additional indicators which so far is disadvantageous as the driver himself will have to compare the indicated value to the speed at the time being and draw the appropriate conclusions. Thus such embodiments with respect to driving comfort and operating reliability do not meet all requirements, because the driver has to read two instruments in the instrument panel partly being located far away from each other.

The invention is based on the problem in connection with fuel consumption measuring to create a device which can universally be used without complicated adaptation work and with means as simple as possible and at any time exactly indicates the quantity of fuel still left in the tank. Moreover the device is to be designed in a manner that also the momentary fuel consumption may be detected with a minimum of additional costs. Said momentary fuel consumption is to be indicated in a way that the the driver can easily evaluate it. This problem is solved according to the invention by the features of the characterising clause of claim 1. The invention thereby starts from the basic idea that a sufficiently exact indication of the fuel being in the tank is possible by a comparison between the quantity of fuel filled in at the filling station and the quantity of fuel consumed during operation of the vehicle. In such a device the shape of the tank does not influence the exactness of the result of measurement, so that this device can be universally used. Furthermore it is essential that with this device an output signal of a primary element is already available, from which in a simple manner also the momentary fuel consumption can be derived. In difference to the known devices thus with the device according to the invention the two measuring methods for the level of fuel in the tank and the momentary fuel flow are not independent of each other. The one measuring and indicating method is rather arranged in a manner that signals for the indication of the other measured value are available.

A very simple embodiment which is not much susceptible to trouble according to an advantageous development of the invention is achieved in that the primary elements release an electric pulse each as an output signal per unit of quantity filled into the tank or taken from the tank and that in the evaluation circuit the two output signals are conducted to a bidirectional counter. When in this connection and in the following text it is spoken of a bidirectional counter not only a digital unit is meant. The bidirectional counting can also be effected in analogue manner, for instance by charging and discharging a capacitor.

Since such a bidirectional counter generally cannot simultaneously evaluate signals for both directions of counting, the signals have to be separated. This is achieved according to the invention in that the control input of the bidirectional counter is connected to the ignition switch in order to determine the direction of counting. This development is based on the idea that in practice fuel is not filled into the tank and taken out of the tank at the same time. It is thereby considered that during refuelling of a motor vehicle the ignition is usually switched off and that on the other hand fuel is taken out of the tank only when the ignition is switched on.

Now it has indeed to be considered that, especially at higher temperatures, a considerable quantity of the normally used fuel vaporizes in the tank and the indicator thereby pretends too high a level of fuel in the tank. This disadvantage can be easily cured in that the unit of quantity releasing a signal pulse of the primary element is bigger for the fuel conducted into the tank than the unit of quantity for the fuel taken out of the tank. At least during refuelling this embodiment indicates too small a quantity, so that the driver could be irritated. Besides an embodiment of such a design would not meet the requirements with respect to exactness of indication.

According to a further advantageous development of the invention it is therefore suggested that the bidirectional counter is programmable and at least one switch is located in the tank which at a particular level of fuel in the tank releases a signal to set the bidirectional counter at a value corresponding to the level of fuel in the tank. In this embodiment it is thus ensured that at particular levels of fuel independent of the exactness of the primary elements the bidirectional counter will be set on the exact value and thereby the indication will be corrected.

According to another embodiment of the invention it is provided that the output signal of the primary element for the fuel taken out of the tank is compared to a reference size, preferably a time base, and that the control signal derived therefrom influences an indicator which is integrated into a speedometer of the motor vehicle, so that a direct assignment of consumed fuel and driving speed is given. Then the driver can read on one indicator, whether the momentary fuel consumption at a specific driving speed does correspond to the usual fuel consumption or not.

The indicator for the momentary fuel flow will preferably include several signalling lamps flashing up at a particular fuel consumption per unit of time. These signalling lamps are integrated into the speedometer in a way that during normal driving conditions that signalling lamp flashes up which is assigned to the present speed. However an embodiment can also be imagined in which all signalling lamps symbolizing a smaller value than the measured one are flashing up, so that a kind of light band is created. For such an indicator independent protection is claimed.

In an especially preferred embodiment these signalling lamps are luminescent diodes emitting light of several colors. Thereby it is especially intended that the one luminescent diode which symbolizes a momentary fuel flow value which is bigger than the value appearing with exact adjustment of the engine and normal driving conditions flashes up red in order to point out to the driver that there is a defect.

The primary element for the fuel filled into the tank will preferably be installed into the filler cap, whereas the primary element for the fuel taken out of the tank may be inserted at any place. If the vehicle is equipped with a fuel supply system having a pump installed in the tank it will be reasonable to combine the primary element for the fuel taken out of the tank and said petrol pump to a constructional unit. Furthermore it is possible to arrange the switches being used to correct the counter reading on this fuel pump which is usually fixed to the tank cap by a support and extends near to the bottom of the fuel tank. In order to simplify the system further it is also imaginable to combine the primary element for the fuel filled into the tank and the fuel pump to one unit. Then all signalling wires can be combined to a harness which through the tank cap conducts to the evaluation circuit.

Figure 2:
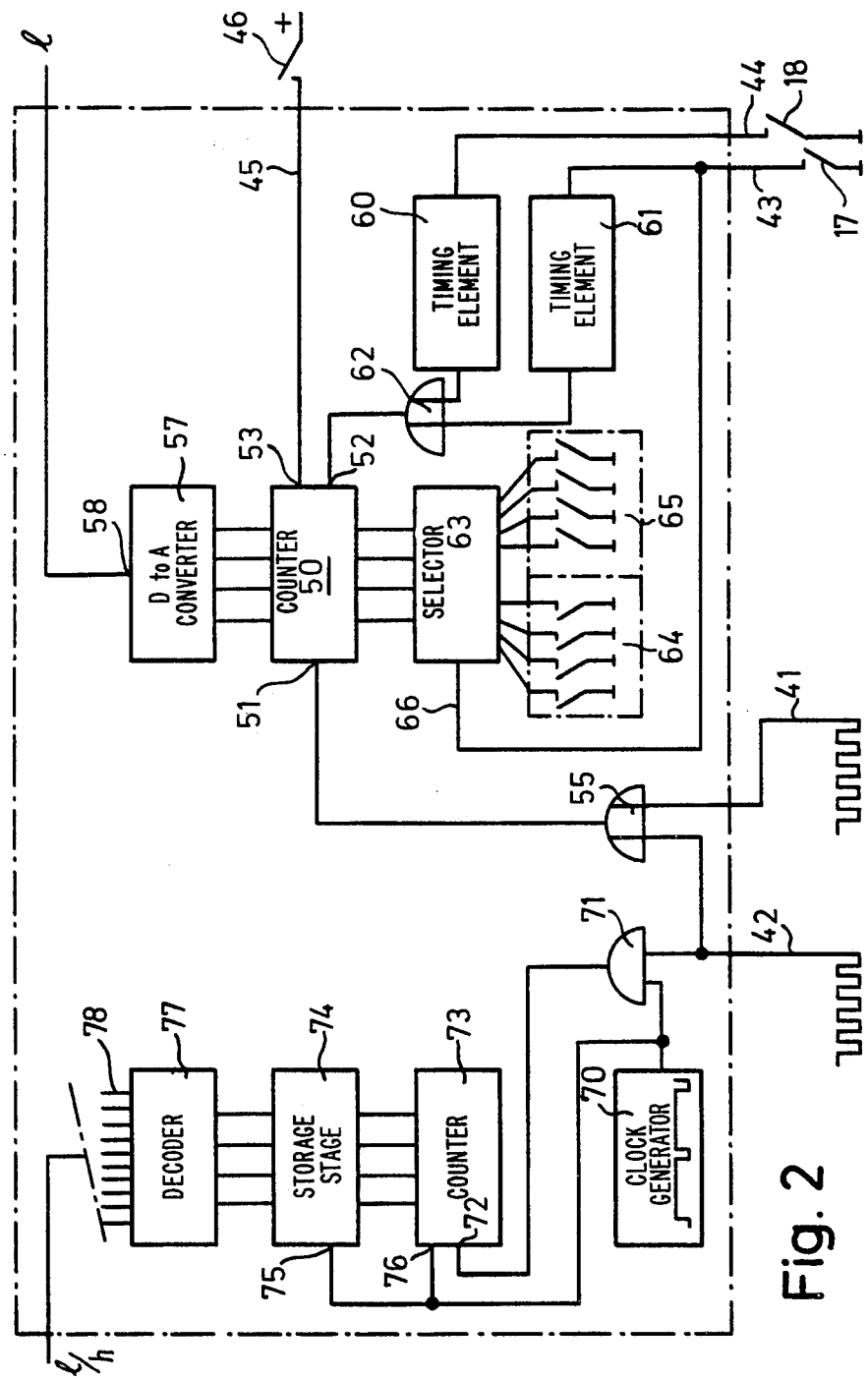

The invention is described below by way of the embodiment shown in the accompanying drawing, in which FIG. 1 is a schematic view on the various systems of the device according to the invention and FIG. 2 is a schematic circuit diagram of the evaluation circuit.

Two primary elements 11 and 12 are installed in the tank as a whole designated by 10. The one primary element 11 detects the fuel filled into the tank and is located in the filler cap 13. The other primary element 12 detects the fuel taken out of the tank and is combined to a constructional unit with a petrol pump 14 and its support 15. This constructional unit is mounted on the tank cap 16. From the schematic view in FIG. 1 can be seen that to this constructional unit also two switches 17 and 18 are fixed. These switches 17 and 18 may be pressure switches being closed, when the level of fuel in the tank has correspondingly risen. The lower switch 17 for instance is to respond, when just a quarter of the maximum quantity of fuel is left in the tank.

In the instrument board of the motor vehicle an indicating unit 20 is installed comprising as well an indicator for the fuel consumed per unit of time as also an indicator for the driving speed of the motor vehicle. The indicator for the driving speed of the motor vehicle is a pointer instrument. The indicator for the fuel consumed per unit of time is provided with several light-emitting diodes 21 and 22 being assigned to particular speed values. The light-emitting diode 22 differs from the other diodes by the colour of the color of the signal. Whereas the luminescent diodes 21 for instance emit green light the luminescent diode 22 is to emit red light. Thereby a fuel flow value is to be indicated which is not possible under normal operating conditions and consequently indicates to the driver a trouble of any kind.

The various luminescent diodes 21 are assigned to the speed symbols in a way that they indicate the momentary fuel flow value which can be awaited at a particular speed under usual operating conditions. If thus the speedometer needle 23 exactly points to the light-emitting diode 21 the driver can recognize by one glance that his driving manner is right. If, however, the light-emitting diode 21 runs ahead of the speedometer needle 23 in clockwise direction, the driver can recognize that the fuel consumption is too high under the given operating conditions. This can for instance mean that there was not selected the optimum speed ratio of the gear.

An analogue indicator is designated by 30 indicating the level of fuel in the tank. This can be a usual voltmeter, but also a digital indication is possible, especially if this indicator 30 is to be integrated into the speedometer. Preferably all indicators will be designed on the basis of the same physical effect, whereby because of reasons concerning energy consumption liquid crystal indicators are preferred.

The control signals for the indicators are supplied by an evaluation circuit 40 via two control signalling wires 41 and 42 being connected to the primary elements 11 and 12 and via two further control signalling wires 43 and 44 to the switches 17 and 18 and a further control signalling wire 45 to the ignition switch 46 of the motor vehicle. In FIG. 2 the mode of operation is shown in principle in said evaluation circuit 40. Deviations from this type are especially imaginable, if the evaluation is effected by a microprocessor controlling switching and regulating processes in the motor vehicle being independent of the measured fuel consumption. FIG. 2 shall make clear the principle of the evaluation circuit, whereby the units necessary to convert the signals are not shown in the drawing, so that it remains easily understandable.

The essential element of the evaluation circuit 40 is a bidirectional counter 50 with a clock input 51 and a preset input 52 and a control input 53 for the determination of the direction of counting. The control input 53 via the control signalling wire 45 is connected to the ignition switch 46 in a manner that the counter will count backward when the ignition switch is closed and forward, when the ignition switch is open. The signal pulses of the two primary elements 11 and 12 are conducted to the clock input 51 of the counter 50 via an OR-gate. In practice these signal pulses do not appear simultaneously, so that only one of the two pulse sequences can be measured at the clock input 51. To the output of the bidirectional counter 50 a digital analogue converter 57 is connected at the output of which a direct current voltage proportional to the counter reading can be measured.

The elements described until now are operating as follows: When the ignition switch 46 is open, the signal pulses of the primary element for the fuel filled into the tank are conducted to the clock input 51 of the bidirectional counter and said counter counts forward. Thereby the d.c. voltage on the output 58 of the digital analogue converter and the pointer 33 of the indicator 30 moves in anticlockwise direction. When the filling process of the tank is terminated the pointer indicates exactly the quantity of fuel which is in the tank now. As soon as the ignition switch 46 is closed the direction of counting of the bidirectional counter 50 changes. As soon as the motor consumes fuel the counter 50 counts the pulses of the output signal of the primary element 12 for the fuel taken out of the tank. The counter reading is thereby diminished. The d.c. voltage on the output 58 of the digital analogue converter changes correspondingly, so that the pointer of the indicator 30 moves in clockwise direction and thus continuously indicates the quantity of fuel being in the tank.

Now it is important that the counter reading of the bidirectional counter is corrected from time to time, in order not to falsify continuously the measuring result in one direction, due to vaporization of the fuel or certain tolerances of the primary elements and unwanted pulses. The two switches 17 and 18 are connected to the input of one timing element 60 or 61 each via the control signalling wires 43 and 44. Each of said timing elements 60 or 61 releases a short pulse as soon as the switching condition of the switches 17 respectively 18 changes. Thus these timing elements can be monoflops triggered by high and low trailing edges. The output signals of the timing elements 60 and 61 are conducted to the set input 52 of the bidirectional counter 50 via an OR-gate 62. The bidirectional counter 50 has parallel preset inputs, which for instance are connected with two coding switches 64 and 65 via a data selector 63. The data selector 63 has a control input 66 being connected with the control signalling wire 43. In dependence of the control signal on this control input 66 either the output signal of the coding switch 64 or the output signal of the coding switch 65 is conducted to the parallel preset input of the bidirectional counter 50. The coding switches can in a simple way be adjusted in a manner that they symbolize a digital number being proportional to the quantity of liquid being in the tank, when the corresponding switches 17 or 18 are closed.

The counter reading of the bidirectional counter 50 is corrected in such a manner that upon closing the switch 17 the control input 66 of the data selector 63 is controlled in such a way that the digital number of the coding switch 64 is driven from the input to the output of the data selector. Simultaneously by closing the switch 17 a set pulse is released via the timing element 61, so that the digital number of the coding switch is read in the bidirectional counter 50. This is effected with priority before the counting procedure which is controlled via the clock input 51. As soon as the liquid level in the tank 10 reaches the pressure switch 17, the bidirectional counter 50 is set on an exactly defined value. If the prior indication should have been wrong, the counter reading and thus the pointer of the indicator 30 jumps to the corrected value. When the switch 18 is closed, a corresponding procedure is effected, whereby now the digital number of the coding switch 65 will be read in the bidirectional counter 50.

The output signal on the control signalling wire 42 of the primary element 12 measuring the fuel taken out of the tank is in addition used in the evaluation circuit 40 to indicate the momentary fuel consumption. A clock generator 70 produces rectangular pulses with a keying ratio of about 90%. During the pulse duration of the signal of said clock generator 7 said pulse signals are conducted from the primary element 12 via the gate 71 to the clock input 72 of a counter 73. The output signal of said counter 73 is conducted to a storage 74 to the preset input 75 of which the output signal of the clock generator 70 is applied. The storage 74 is set with the falling edge of the output signal of the clock generator 70, whereby said output signal is applied to the reset input 76 of the counter 73, the counter 73 is reset to zero. Then the counting process begins anew. A decoder 77 follows the storage 74 having a number of outputs 78 corresponding to the number of light-emitting diodes 21 and 22. Each of these outputs 78 is conducted to one of these light-emitting diodes 21 or 22. The decoder 77 has the function to activate an output of the storage 74 in dependence on the digital number available on its input. Dependent on the digital number thereby one of the light-emitting diodes 21 or 22 flashes up.

In the parts of the circuit described at last thus the output signal of the primary element 12 is compared to a time base, that is the clock signal of the clock generator 70 and a control signal for an indicator is derived from it indicating the fuel consumption referred to the unit of time. Thereby in a very simple manner by multiple use of the signals of the one primary element the value for the momentary fuel consumption being of interest for the driver is indicated as well as the necessary value concerning the quantity of fuel left in the tank. This entire device can be built up of only a few elements, whereby a considerable cost reduction above all will be achieved, when in the future microprocessors are being used apart from this. The primary elements in known manner can be provided with a rotor, whereby the number of revolutions is determinated via photo diodes, magnetic coils, reed contact or NTC resistor and transformed into a suitable electric signal. If the primary elements 11 and 12 as well as the switches 17 and 18 together with the petrol pump are integrated to one constructional unit, the assembly in the motor vehicle is very simple, too. Thereby it has additionally to be considered that the wiring of the control wires is very simple then, because only one harness has to be installed.

What we claim is:

1. Apparatus for measuring and indicating the quantity of fuel in a tank of an automotive vehicle said tank having a fuel inlet and a fuel output, said apparatus comprising:
   first means coupled to said inlet of said tank for providing a first signal porportional to the quantity of fuel delivered into said tank;
   second means coupled to said output of said tank for providing a second signal proportional to the quantity of fuel delivered from said tank;
   means coupled to said first and second means and responsive to said first and second signals for providing an output signal indicative of the difference between said first and second signals;
   means responsive to said output signal for indicating the quantity of fuel in said tank;
   means for generating periodic signals;
   means coupled to said means for generating signals and to said second means and responsive to said second signal and to said periodic signals for providing a fuel consumption signal proportional to the quantity of fuel delivered from said tank between successive ones of said periodic signals; and,
   means responsive to said fuel consumption signal for indicating the rate of fuel delivery from said tank.

2. Apparatus for measuring and indicating the quantity of fuel in a tank of an automotive vehicle said tank having a fuel inlet and a fuel output, said apparatus comprising: first means coupled to said inlet of said tank for providing a first signal proportional to the quantity of fuel delivered into said tank;
   second means coupled to said output of said tank for providing a second signal proportional to the quantity of fuel delivered from said tank;
   means coupled to said first and second means and responsive to said first and second signals for providing an output signal indicative of the difference between said first and second signals;
   means responsive to said output signal for indicating the quantity of fuel in said tank; and
   wherein said means for providing an output signal comprises a bidirectional counter and wherein said first and second signals are pulses the repetition rates of which are proportional to the respective rate of fuel delivery.

3. The apparatus according to claim 2, including a digital-to-analog converter having an input coupled to the output of said counter and wherein said means for indicating comprises an indicator which is responsive to the analog output of said converter.

* * * * *